Figure 1:
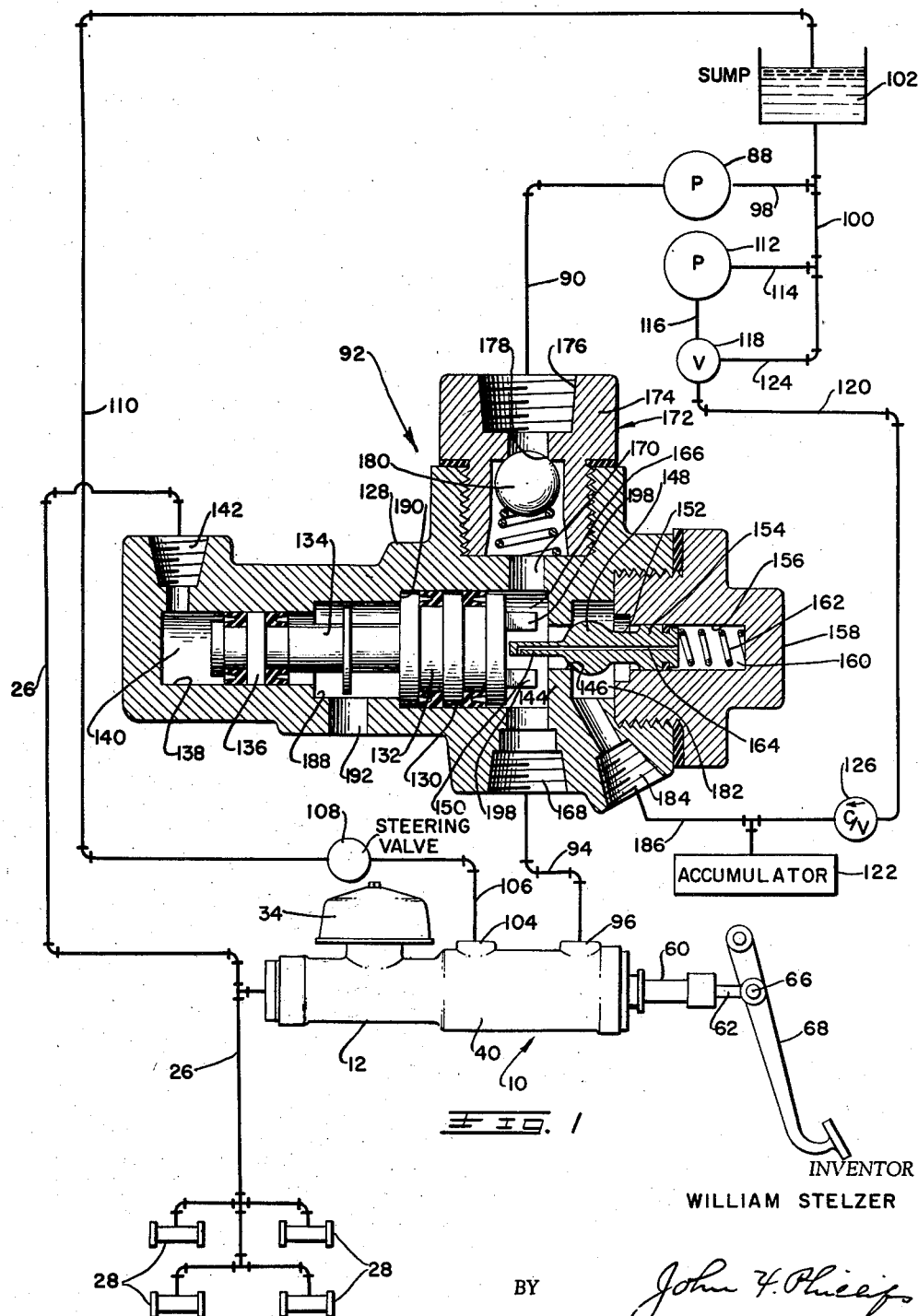

INVENTOR
WILLIAM STELZER
BY John F. Phillips
ATTORNEY

July 19, 1960

W. STELZER 2,945,352

FLUID PRESSURE BOOSTER SYSTEM

Filed July 3, 1957

2 Sheets-Sheet 2

INVENTOR
WILLIAM STELZER

John F. Philips

ATTORNEY

2,945,352
FLUID PRESSURE BOOSTER SYSTEM

William Stelzer, Bloomfield, Mich., assignor to Kelsey-Hayes Company, Detroit, Mich., a corporation of Delaware Filed July 3, 1957, Ser. No. 669,814

13 Claims. (Cl. 60—54.6)

This invention relates generally to fluid pressure booster systems, and more particularly to a fluid pressure booster system including an emergency pressure source available for operation of the system in the event a normal pressure source fails.

The novel system and transfer valve of the present invention is adaptable for use, and described in detail, with a fluid motor of the character disclosed in applicant's copending application Serial No. 631,106, filed December 28, 1956, titled Booster Brake Mechanism. However, this invention is adaptable for use with other fluid motors of the open system type, fluid motors of this character being especially suitable for use in an open or circulating fluid pressure system generally used, for example, in vehicle power steering mechanisms controlled by an open center valve.

An important object of the invention is to provide an improved fluid pressure booster system including an operator-controlled fluid motor normally energizable from a source of circulating fluid, the system including a source of pressurized fluid, and to provide means permitting energizing of the fluid motor from the source of pressurized fluid in the absence of the source of circulating fluid.

A further object is to provide in a system of the character involved a transfer valve connected to an operator-controlled fluid motor and a source of circulating fluid and a source of pressurized fluid, the transfer valve including control means normally isolating the sources of circulating and pressurized fluid and operative due to pedal-generated fluid pressures in the absence of the source of circulating fluid to permit the fluid motor to be energized from the source of pressurized fluid.

A further object is to provide a novel transfer valve for use in a combined "open" and "closed" fluid pressure booster system to permit normal energizing of a fluid motor from fluid circulating in the "open" portion of the system and emergency energization of the fluid motor by the pressurized fluid from the "closed" portion of the system in the absence or failure of the "closed" portion of the system and in response to pedal-generated fluid pressures.

Other objects and advantages of the invention will become apparent during the course of the following description.

Figure 2:
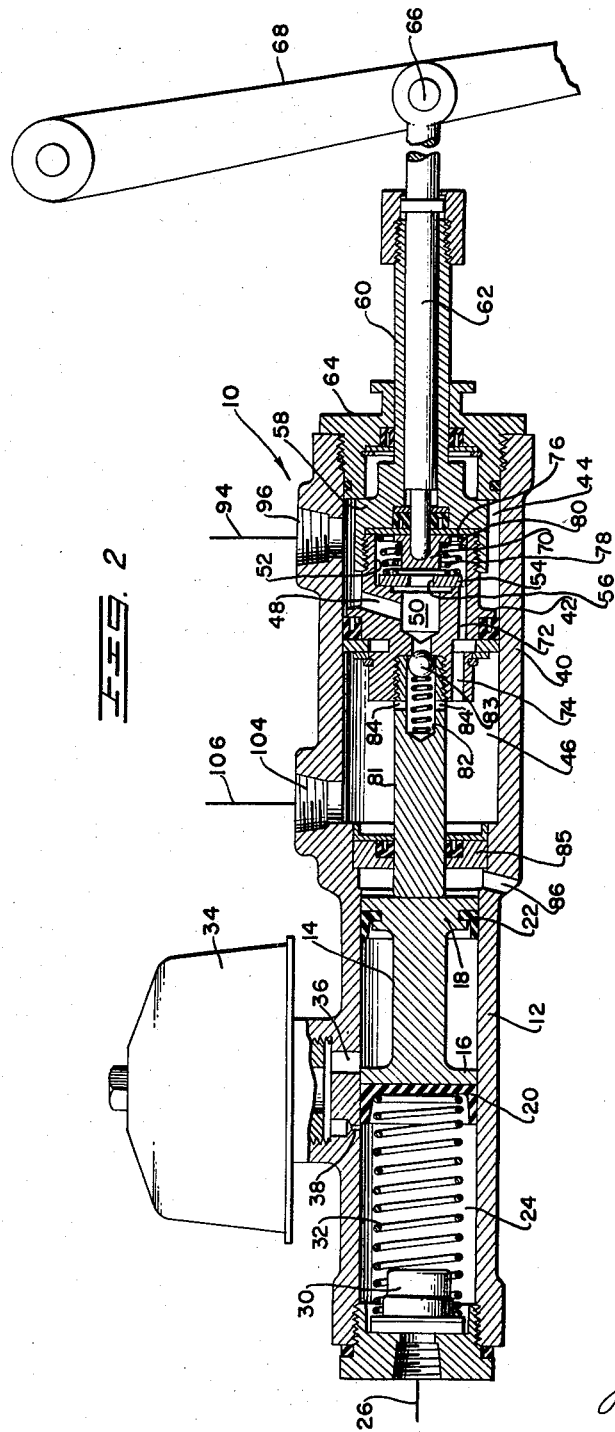

In the drawing there is shown one preferred embodiment of the invention. In this showing:

Figure 1 is an axial section through an emergency transfer valve assembly utilized in a combined "open" and "closed" fluid pressure booster system, with elements of the system being diagrammatically represented; and Figure 2 is an axial section through the fluid motor and master cylinder of Figure 1, parts being broken away and being shown in elevation.

Referring to the drawings, indicated generally at 10 is a fluid motor preferably including a die-cast body, one end 12 of which constitutes a master cylinder in which is arranged a plunger 14, see Figure 2, having heads 16 and 18 at opposite ends thereof, the heads being sealed in the master cylinder as at 20 and 22, respectively. Leftward movement of the plunger 14 from the normal position shown in Figure 2 will result in the generation of fluid pressure in a master cylinder chamber 24, such generated pressure being directed through a fluid line 26 to vehicle wheel cylinders 28. The master cylinder 12 is provided with a conventional residual pressure valve 30 and a return spring 32 is interposed between this valve and the seal 20 to bias the plunger 14 to the normal position shown in Figure 2. The master cylinder is provided thereabove with a fluid supply reservoir 34 communicating with the space behind the head 16 through the usual port 36 and ahead of and immediately adjacent the lip of the seal 20 through a small replenishing port 38.

The fluid motor 10 comprises a cylinder 40, the internal diameter of which is appreciably larger than the internal diameter of the master cylinder 12. The cylinder 40 includes therein a piston 42, suitably sealed and dividing the cylinder 40 to form inlet and outlet chambers 44 and 46 respectively. The chamber 44 communicates through a passage 48 with a bore 50 within the piston 42. The piston 42, rearwardly of the bore 50, has an enlarged bore 52 in which is received a disc valve 54 normally engaging the shoulder between the bores 50 and 52, the disc valve being provided with an axial opening 56.

The piston 42 has threaded on the rear end thereof a cap 58 carrying an integral rearwardly extending tubular sleeve 60 in which is slidable a rod 62. The sleeve 60 slides in a suitable bearing 64 threaded in the rear end of the cylinder 40, and the piston and bearing are suitably sealed with respect to each other. A portion of the cap 58 will abut the inner end of the bearing 64 to limit rearward movement of the piston 42. The rod 62 is pivotally connected as at 66 to a conventional brake pedal 68.

The forward or left-hand end of the rod 62 has a reduced diameter and is received in the recessed rear end of a head or valve 70 normally spaced from the valve 54 to permit normal communication between the bores 50 and 52. The bore 52 communicates through a passage 72 with a passage 74 opening into the chamber 46. When the parts are in the normal position shown, fluid can flow freely between the chambers 44 and 46.

Rearward movement of the valve 70 is limited by a washer 76 serving to maintain a suitable seal about the forward reduced diametered portion of the rod 62. The valve 70 is biased rearwardly by a relatively light spring 78, and this spring is surrounded by a second heavier spring 80 which biases the disc valve 54 against its seat as shown in Figure 2.

An axial rod 81 is threaded at its rear end in the piston 42 and is provided at such rear end with a bore 82 adapted under certain conditions to communicate with the bore 50. This communication is normally cut off by a spring biased ball valve 83. The bore 82 communicates with the chamber 46 through ports 84.

The forward end of chamber 46 is defined by a bearing 85 through which the rod 81 extends, said bearing incorporating a suitable seal surrounding said rod. The space between the head 18 of the plunger 14 and the bearing 85 is vented to the atmosphere as indicated at 86.

A constantly operating fluid pump generally associated with the power steering mechanism of a vehicle (not shown) is diagrammatically illustrated and indicated at 88. The outlet of this pump communicates through a hydraulic line 90 with the inlet port of a transfer valve indicated generally at 92, the function of which will subsequently be described in detail, and normally fluid will pass from the hydraulic line 90 through the transfer valve 92 and from an outlet port through a hydraulic line 94 communicating with a port 96 leading into the chamber 44. Fluid is supplied to the pump 88 through a branch line 98 connected to a line 100 leading from the usual sump 102.

The chamber 46 is provided with an outlet port 104 connected to one end of a hydraulic line 106 leading to a conventional steering valve 108, and from this valve a return line 110 leads to the sump 102.

The structure just described comprises the "open" portion of the fluid pressure booster system, the fluid motor 10, as will subsequently be described in detail, functions in the manner set forth in detail in the aforementioned co-pending application for patent. The transfer valve 92, under normal conditions, permits the circulation of fluid from the pump 88 through said valve for energizing the fluid motor 10. However, in the event there is a failure of the operation of the pump 88, the transfer valve 92 will function to permit emergency operation of the fluid motor 10, utilizing the "closed" portion of the system. Thus the transfer valve 92 provides a compatible "open" and "closed" fluid pressure booster system.

The closed portion of the fluid pressure booster system comprises either an intermittently or constantly operating pump 112, the inlet side of which communicates through a hydraulic line 114 to the line 100 connected to the sump 102. The outlet side of the pump 112 is connected by a fluid line 116 to a suitable conventional pressure responsive valve 118 of any suitable character, the outlet side of which is connected to a fluid line 120 leading to an accumulator 122 for storing therein pressurized fluid at a predetermined maximum pressure. The valve 118 will maintain in the accumulator 122 the predetermined maximum pressure available for emergency operation of the fluid pressure booster system, and when the predetermined pressure is reached in the accumulator, fluid pumped from the pump 112 is bypassed through a branch line 124 connected to the valve 118, said line 124 being connected to the line 100. A suitable check valve 126 is interposed in the line 120 to permit fluid flow only toward the accumulator 122.

The transfer valve 92 comprises a body 128 having a bore 130 therein in which is arranged a suitably sealed piston 132. The piston 132 is connected by a stem 134 to a smaller piston 136 suitably sealed and operating in a smaller diametered bore 138. One end of the piston 136 forms with the body 128 a chamber 140 connected through a port 142 to a portion of the fluid line 26, which as previously described, is the line leading to the wheel cylinders 28, this being the high pressure end of the booster system.

Extending transversely of the right-hand end of the bore 130 is a valve seat portion 144 having a valve seat 146 normally engaged by a valve element 148. The valve element 148 includes an axially projecting stem 150 extending through the valve seat portion 144 and terminating in close proximity to the adjacent end of the piston 132, but normally being in spaced relationship therefrom. The other end of the valve element 148 extends axially as at 152, terminating in a piston 154 operable in a bore 156 formed in a plug 158 threaded in the end of the body 128. The piston 154 forms with the plug 158 a balancing chamber 160 including a biasing spring 162 therein, normally urging the valve element 148 toward the left onto the valve seat 156. The chamber 160 communicates through a valve passage 164 in the valve element 148 with a chamber 166 formed to the right of the piston 132 by the exposed surface of the piston and the adjacent side of the valve seat portion or wall 144.

The chamber 166 communicates through an outlet port 168 with the fluid line 94 connected to the inlet port 96 of the fluid motor. The chamber 166 also communicates through a port 170 with the fluid line 90 connected to the outlet side of the pump 88. Interposed between the port 170 and the line 90 is a check valve indicated generally at 172 comprising a body 174 threaded into a suitably formed boss on the body 128 of the transfer valve. The body 174 includes an inlet port 176 and a transverse valve seat portion 178 engaged by a spring biased ball 180. The check valve 172 prevents back flow of fluid to the pump 88 when the pump 88 is not operating and the emergency or "closed" portion of the system takes over.

The valve seat portion 144 forms with the piston 154 of the valve element 148 a chamber 182 communicating through a port 184 with a fluid line 186 connected to the accumulator 122.

Formed in the body 128 axially between the bores 130 and 138 is an intermediate bore 188 forming with the bore 130 a shoulder 190 against which the piston 132 is normally seated and defining the maximum leftward movement of said piston. The bore 188 is suitably vented at 192 to permit free axial movement of the pistons 130 and 136 without any accumulation of back pressure.

The face of the piston 132 exposed in chamber 166 incorporates longitudinally projecting abutments 198 normally spaced from the adjacent side of the valve portion 144 and engageable therewith during emergency conditions but maintaining communication between the chambers 166 and 182 when the valve element 148 is displaced during emergency operation of the system as described below.

*Operation*

The parts during normal operating conditions occupy the positions shown in the drawings. The source of circulating fluid will be available from the pump 88, passing through the line 90, through the check valve 172, through the chamber 166 and out of the port 168 to the fluid line 94. The fluid then circulates through the fluid motor 10, into the port 96, through the chamber 44 and port 48, into the bore 50, through the disc valve 54 and through the passages 72 and 74 into the chamber 46. The fluid then flows out of the port 104 through the line 106 and through the open-center steering valve 108 through the line 110 to the sump 102.

Actuation of the brake pedal 68 results in a throttling of fluid flowing into the chamber 44, causing a build-up of pressure in chamber 44 causing the piston 42 to move toward the left as viewed in Figure 2. Reaction characteristics will be transmitted to the operator of the brake pedal 68 through the valve 70 and rod 62. Movement of the piston 42 results in simultaneous movement of the axial rod 81 causing the plunger 14 to be moved toward the left and fluid to be displaced from the chamber 24 to the wheel cylinders 28 and also to the chamber 140 of the transfer valve.

During normal operating conditions, when the fluid motor 10 is energized, the pressure in the chamber 166 acting on the area of the piston 132 exposed thereto will be sufficient to overcome the combination of boosted and foot pressures generated in the chamber 140 and accordingly the pistons 132 and 136 will be maintained in the position shown in Figure 1. The passage 164 of the valve element 148 maintains a balance between the pressures in chambers 166 and 160. The area of the valve element 148 subject to the pressure developed in chamber 166 is equal to the effective area of the piston 154. Those portions of the valve element 148 exposed to the pressures in chamber 182 are balanced, and accordingly the spring 162 is effective to urge the valve element 148 onto the valve seat 146 and isolate the pressure in chamber 182 from the chamber 166.

If the pump 88 ceases to operate, for example, by the stalling of the vehicle engine, actuation of the brake pedal 68 will result in the development of pedal-generated fluid pressure in chamber 24 which will be directed to chamber 140 of the transfer valve. At this time no pressure will have developed in chamber 166, and the pressure developed in chamber 140 will react against piston 136 to move the pistons 136 and 132 toward the right. The piston 132 will engage the terminal end of the stem 150 and open the valve 148. Pressurized fluid from the accumulator 122 will then flow from the chamber 182 into the chamber 166, through the port 168 into the line 94 and into the fluid motor in the manner previously described. This renders the "closed" portion of the system operative, the throttling valve 70 being closed in the fluid motor and pressure will accordingly develop in the chamber 44 and move the piston 42 to assist the operator of the system in generating sufficiently high pressures in the wheel cylinders in order that the system operate the same as when the pump 88 was functioning properly.

Development of the accumulator pressure in chamber 166 will tend to urge the piston 132 back toward its normal position. This piston, however, will strike a more or less balanced position in which suitable pressures will be supplied to the fluid motor 10. In other words, if the piston 132 should move fully to the normal position shown in Figure 1, the valve element 148 will again seat, thus dropping pressure in the chamber 166 and rendering pressure in the chamber 140 again effective for cracking the valve element 148 to maintain the proper degree of hydraulic pressure in the fluid motor.

Referring to the pistons 132 and 136, during emergency brake applications, the ratio between their effective areas exposed to pressures in chambers 166 and 140 should be large enough relative to the booster ratio of the booster motor mechanism to insure that valves 54 and 70 are closed when pistons 136 and 132 are in a substantially pressure-balanced condition. The pedal force necessary, during emergency brake application, to retain the valves 54 and 70 closed, should be just slightly greater than the pressure in chamber 50 of the booster motor so that a slight reduction in operator imposed pressure on the brake pedal will crack the valve 54 to permit substantially instantaneous reduction in pressure in the brake system.

If the effective area of piston 132 is too small, so that the ratio between the effective areas between the pistons 136 and 132 is too low, during an emergency brake application, then when the fluid pressure is metered into chamber 50 from the accumulator, the valve 54 will be cracked, resulting in a loss of emergency fluid pressure from the accumulator.

If the area of the piston 136 is too small in relation to the area of the piston 132, a lower pressure in the chamber 166, after the valve 148 has been opened, will move the piston structure to release the valve 148 for movement to closed position. Under such conditions, a substantially lower pressure than desired will exist in the motor chamber 50 in relation to the force being applied by the operator against the pedal. Then, when the pressure against the pedal is released, a substantial reduction in the force applied to the valve 54 will be necessary before this valve will open to relieve pressure from the chamber 50. This causes a lagging of the releasing of the brakes in response to the releasing of the brake pedal 68. This would result in a less effective system with lack of "feel" or control of the braking operation. Therefore, it is important that the areas of the piston 132 and 136 be such that only a slightly lower pressure be maintained in the chamber 50, during a braking operation, than is necessary to unseat the valve 54.

The fluid motor per se is disclosed and claimed in the co-pending application Serial No. 631,106, filed December 28, 1956. The novel fluid pressure booster system may be utilized with other types of open system fluid motors than that disclosed herein by way of example.

It is to be understood that the form of the invention shown and described is to be taken as the preferred example of the same and that various changes in the shape, size and arrangement of the parts may be made as do not depart from the spirit of the invention or the scope of the appended claims.

I claim:
1. A fluid pressure booster system comprising a source of circulating fluid and a source of pressurized fluid, a fluid motor including a pressure responsive unit dividing said motor to form inlet and outlet chambers respectively having an inlet and an outlet port, a chamber including a discharge port, fluid displacing means movable in said chamber and connected to said pressure responsive unit, operator-operated control means in said motor normally affording communication between said inlet and outlet chambers and operable for throttling fluid passing from said inlet chamber to said outlet chamber for actuating said pressure responsive unit and said fluid displacing means for urging pressurized fluid out of said discharge port, and a transfer valve connected to said sources of circulating and pressurized fluid, said inlet port and said discharge port, said transfer valve comprising control means normally providing communication of said source of circulating fluid to said inlet port and isolating said source of pressurized fluid therefrom and operable upon a failure of said source of circulating fluid to communicate said source of pressurized fluid to said inlet port.

2. A fluid pressure booster system as set forth in claim 1 in which said transfer valve includes a first chamber through which said circulating fluid normally passes, a second chamber connected to said source of pressurized fluid and a third chamber communicating with said discharge port, said control means including a valve assembly controlling communication between said first and second chambers and pressure responsive actuator means subject to pressures in the first and third chambers and engageable with said transfer valve for actuating the latter upon a failure of said source of circulating fluid to connect said first and second chambers to each other.

3. A fluid pressure booster system as set forth in claim 2 in which said transfer valve includes a valve seat separating said first and second chambers and a spring-urged and normally pressure-balanced valve element normally engaging said valve seat, said valve element including a portion extending through said valve seat into said first chamber, said actuator means comprising a movable pressure responsive member having opposite ends exposed in said first and third chambers, said end exposed in said first chamber being normally in spaced relation from said portion of said valve element in said first chamber and engageable therewith upon a failure of said source of circulating fluid.

4. A fluid pressure booster system as set forth in claim 3 in which said second and third chambers are in linear relationship on opposite sides of said first chamber.

5. A transfer valve for use in a fluid pressure booster system, comprising a body member, a first chamber in said body member, inlet and outlet ports communicating with said first chamber and adapted for connection in series with a circulating fluid system for the continuous flow of fluid through said first chamber, a second chamber in said body member, valve seat means separating said first and second chambers, an inlet port communicating with said second chamber and adapted for connection with a source of pressurized fluid, a third chamber in said body member, an inlet port communicating with said third chamber and adapted to connect such chamber with a source of control fluid pressure, and control means in said body member having a movable portion provided with pressure areas exposed to said first and third chambers, said control means comprising a valve normally engaging said valve seat means and closing communication between said first and second chambers, said portion of said control means being mechanically engageable with said valve to open it when pressure in said third chamber is higher than pressure in said first chamber to connect said first chamber to said second chamber.

6. A transfer valve as set forth in claim 5 including check valve means connected to the inlet port of said body member for preventing back flow of fluid therethrough.

7. A transfer valve as set forth in claim 5 in which said valve is in said second chamber, a valve body carrying said valve, said valve body including a portion forming a balancing chamber with said body member, said valve body including means communicating said first and balancing chambers for exposing opposite ends of said valve body to the same pressure.

8. A transfer valve as set forth in claim 7 including a biasing spring in said balancing chamber engaging said valve body and urging said valve toward sealing engagement with said valve seat means.

9. A transfer valve as set forth in claim 7 in which said body member includes a cylindrical bore continuing in an increased diametered bore portion opening into said first chamber, said movable portions of said control means including at opposite ends piston portions respectively conforming to the cylindrical bore and increased diametered bore portion, said piston portion in said increased diametered bore portion presenting a greater exposed area in said first chamber than the exposed area of said piston portion in said third chamber for normally biasing said last-named piston portion away from said valve.

10. A transfer valve as set forth in claim 5 in which said movable portion and said valve seat means have interengageable portions to limit movement of said movable portion for insuring fluid movement through said first chamber when said first and second chambers are in communication.

11. A transfer valve for use in a fluid pressure booster system, comprising a body member, a first chamber in said body member, inlet and outlet ports communicating with said first chamber and adapted for connection in series with a circulating fluid system for the continuous flow of fluid through said first chamber, a second chamber in said body member, valve seat means separating said first and second chambers, an inlet port communicating with said second chamber and adapted for connection with a source of pressurized fluid, a third chamber in said body member, an inlet port communicating with said third chamber and adapted to connect such chamber with a source of control fluid pressure, said body member being provided with relatively larger and smaller cylindrical bores respectively forming said first and third chambers, larger and smaller connected pistons reciprocable in the respective bores, the remote ends of said pistons being exposed respectively to said first and third chambers, a valve in said second chamber normally engaging said valve seat means to close communication between said first and second chambers, means biasing said valve to closed position, said larger piston having a normal position in which it has lost motion connection with said valve, which lost motion is taken up to open said valve when pressure in said third chamber is higher to a predetermined extent than pressure in said first chamber to connect said first and second chambers, and a check valve connected with said inlet port opening inwardly toward said first chamber.

12. A transfer valve according to claim 11 provided with a bore, a valve body carrying said valve and having a plunger portion slidable in said last-named bore, said valve body having an opening therethrough communicating between said last-named bore and said first chamber.

13. A transfer valve according to claim 11 provided with a bore, a valve body carrying said valve and having a plunger portion slidable in said last-named bore, said plunger portion of said valve body forming with said last-named bore a balancing chamber in which said biasing means is arranged, said valve seat means having an opening therethrough equal in diameter to the diameter of said last-named bore, said valve body having an opening therethrough communicating with said balancing chamber and said first chamber.

References Cited in the file of this patent

UNITED STATES PATENTS

| | | |
|---|---|---|
| 2,472,695 | Chouings | June 7, 1949 |
| 2,569,028 | Stryker | Sept. 25, 1951 |
| 2,670,004 | Deardorff et al. | Feb. 23, 1954 |
| 2,696,827 | Deardorff et al. | Dec. 14, 1954 |
| 2,698,205 | Gagen | Dec. 28, 1954 |

FOREIGN PATENTS

| | | |
|---|---|---|
| 622,617 | Great Britain | May 4, 1949 |
| 795,874 | Great Britain | June 4, 1958 |